United States Patent [19]
Hoyle et al.

[11] Patent Number: 5,193,961
[45] Date of Patent: Mar. 16, 1993

[54] PIN AND GROMMET

[75] Inventors: Christopher J. Hoyle, Chicago; Brian R. Peek, Mokena, both of Ill.

[73] Assignee: Illinois Tool Works Inc., Glenview, Ill.

[21] Appl. No.: 834,404

[22] Filed: Feb. 12, 1992

[51] Int. Cl.$^5$ ............................................. F16B 21/00
[52] U.S. Cl. .................................... 411/553; 411/44; 411/182; 411/508; 24/297
[58] Field of Search ................... 411/44, 15, 182, 508, 411/553, 908, 918; 24/297, 326, 453; 403/405.1, 406.1, 348

[56] References Cited

U.S. PATENT DOCUMENTS

| | | | |
|---|---|---|---|
| 3,038,747 | 6/1962 | Rapata | 411/508 X |
| 3,678,798 | 7/1972 | Van Niel | 411/43 |
| 3,756,116 | 9/1973 | Schuplin | 411/182 X |
| 3,964,364 | 6/1976 | Poe | 411/43 |
| 4,276,806 | 7/1981 | Morel | 411/15 X |
| 4,647,262 | 3/1987 | Yokota | 411/44 |
| 4,668,145 | 5/1987 | Hirohata | 411/508 |
| 4,726,722 | 2/1988 | Wollar | 411/508 X |
| 4,865,505 | 9/1989 | Okada | 411/508 X |
| 4,927,306 | 5/1990 | Sato | 411/182 |
| 5,028,190 | 7/1991 | Loughlin et al. | 411/15 X |

FOREIGN PATENT DOCUMENTS

| | | | |
|---|---|---|---|
| 149312 | 2/1982 | Japan | 411/508 |
| 1520155 | 8/1978 | United Kingdom | 411/15 |

Primary Examiner—Renee S. Luebke
Assistant Examiner—Suzanne L. Dino
Attorney, Agent, or Firm—Thomas W. Buckman; John P. O'Brien

[57] ABSTRACT

A pin and grommet assembly includes a push-pin and a grommet of unique construction which is capable of absorbing variations in the relative positions of a supporting panel and a mating panel to be attached caused by thermal expansion and contraction. A pair of diametrically opposed semicylindrical-shaped portions are disposed on the push-pin and cylindrical-shaped mating grooves are formed in the interior of the grommet for retaining freely floating the semicylindrical-shaped portions in the grommet so as to permit lateral sliding engagement between the opposed outer wall surfaces on the shorter sides of the main body portion of the grommet.

12 Claims, 3 Drawing Sheets

PIN AND GROMMET

BACKGROUND OF THE INVENTION

1. Field of the Invention

This invention relates generally to fasteners for securing panel-like members together and more particularly, it relates to a push-pin and grommet assembly in which the grommet is inserted and retained in a fitting hole in a supporting panel, such as a metal door panel of an automobile vehicle, and thereafter to receive the push-pin for mounting a mating panel having a throughhole, such as a decorative lining panel, to the door panel. The push-pin and grommet assembly is adapted to absorb variations in the relative positions of the supporting panel and the mating panel caused by thermal expansion and contraction due to temperature changes.

2. Description of the Prior Art

A state-of-the-art search directed to the subject matter of this application uncovered the following patents:

| | |
|---|---|
| 3,964,364 | 4,762,437 |
| 4,176,428 | 4,893,978 |
| 4,238,446 | 4,981,405 |
| 4,240,323 | 5,011,356 |
| 4,716,633 | |

There is disclosed in U.S. Pat. No. 3,964,364 to L. Richard Poe issued on Jun. 22, 1976, an initially single-piece fastener for detachably securing a pair of perforated members 21 and 22. The fastener includes a grommet 1 and a stud 12. The grommet has a head 2 with an opening therethrough and a pair of spreadable stem elements 5. The stud is initially attached at one end integrally to the grommet within the opening and is arranged, when severed from the head, to move axially between the stem elements. Thereafter, the stud is rotatable relative to the grommet so as to lock or release the grommet with respect to the perforated members.

There is disclosed in U.S. Pat. No. 4,176,428 to Shigeru Kimura issued on Dec. 4, 1979, a fixing device formed of a male member 1 adapted to be fixed to a decorating panel 3 and a complimentary female member 2 adapted to be attached to a supporting panel 17. The male member is provided with a holding flange 8 and a main flange 9 for securing the decorating panel therebetween. The male member further includes a shaft 6 extending from the lower surface of the main flange and a terminal bulbous engaging portion 10. The female member is provided with a hollow barrel body 11 having a flange head 13 at the open end of the barrel and shoulder means 14 for retaining the barrel in the supporting panel. The female member further includes a plurality of raised axially extending ribs 20 defining first and second spherical cavities 15 and 16 in spaced-apart relation and adapted to engage the bulbous engaging portion 10 in two axially spaced positions.

In U.S. Pat. No. 4,716,633 to Léandre Rizo issued on Jan. 5, 1988, there is taught a device suitable for fixing panels comprised of a male part 11 and a female part 31. The male part has a mounting head 12 and an elongated body 16 extending between the mounting head and a retaining head 23. The retaining head has a retaining surface 24 directed towards the mounting head, a snap-fastener surface 25, and a retaining edge 27 defined by the intersection of the retaining surface with the snap-fastener surface. The female part has a receptacle 34 for receiving the body 16 of the male part and at least one circumferential sector 36 for retaining the retaining head 23 of the male part in the axial direction. The retaining edge 27 is adapted to penetrate the sector 36 to provide an axial retention opposing withdrawal of the male part from the receptacle 34 in the female part.

In U.S. Pat No. 4,893,978 to Francis G. Franco issued on Jan. 16, 1990, there is taught a twistlock fastener 10 formed of a base member 12 and a latching member 14. The base member has a mounting portion 16 and a socket portion 18 with a square-shaped internal bore 22. The latching member is formed with a head portion 34 and a shank portion 36. The shank portion has a cylindrical section 38 adjacent to the head portion and has a pair of resilient bifurcated leg elements 42, 44 integrally formed with the cylindrical section. Each of the leg elements have a radial surface to provide latching shoulders 50, 52 for retaining the shank portion 36 in the bore 22. In order to permit the latching member to be rotatable relative to the square-shaped bore 22 in the base member 12, there are provided four rounded corner edges 71-76 which extend lengthwise of the leg elements between the cylindrical section 38 and the latching shoulders 50, 52. In order to provide positive quarter-turn latching positions, a flat surface 76 and 78 is formed on the respective leg elements 42 and 44 and tapers inwardly from the respective shoulders 50, 52 to the juncture with the cylindrical section to define triangular sections 80, 82 for engagement with the four sidewalls 28 of the bore 22.

In U.S. Pat. No. 5,011,356 to Miguel C. Fernandez issued on Apr. 30, 1991, there is disclosed a quarter-turn fastener for securing together a plurality of overlapped panels which is comprised of an elongated body portion 1, a head 2 disposed on one end of the body portion for engaging the outer surface of the uppermost panel, and a pair of resiliently flexible fingers 8 disposed on an opposite end of the body portion. A pair of diametrically opposed inclined cam portions 7a are also provided on the body portion at a position axially between the opposite ends of the body portions so as to engage the outer surface of the lowermost panel. When the fastener is rotated 90°, the cam portions will force the lowermost panel to move upwardly toward the uppermost panel so as to compress and seal together the plurality of overlapped panels.

The remaining patents listed above but not specifically discussed are believed to be of only general interest and show the state of the art in fixing devices for securing together panel-like members.

However, none of the prior art uncovered in the search disclosed push-pin and grommet assembly of a unique construction like that of the present invention which is capable of absorbing variations in the relative positions of a supporting panel and a mating panel to be attached caused by thermal expansion and contraction. This is accomplished by a pair of diametrically opposed semicylindrical-shaped portions and an enlarged tip portion formed on the push-pin and by providing cylindrical-shaped mating grooves and a substantially U-shaped mating slot formed in the grommet for retaining freely floating the semicylindrical-shaped portions and the tip portion in the respective grooves and slot so as to permit lateral sliding engagement between the opposed outer wall surfaces on the short sides of the main portion of the grommet. As a result, the push-pin and grommet assembly after fixation in the supporting panel allows for thermal expansion and contraction of the mating panel due to changes in the ambient temperature causing variations in the relative lateral positions of the mating panel and the supporting panel.

SUMMARY OF THE INVENTION

Accordingly, it is a general object of the present invention to provide an improved push-pin and grommet assembly which is relatively simple and economical to manufacture and use.

It is an object of the present invention to provide an improved push-pin and grommet assembly of the type in which the grommet is inserted and retained in a fitting hole in a supporting panel and thereafter to receive the push-pin for mounting a mating panel having a throughhole to the supporting panel.

It is another object of the present invention to provide an improved push-pin and grommet assembly which is capable of absorbing variations in the relative positions of a supporting panel and a mating panel to be attached caused by thermal expansion and contraction.

It is still another object of the present invention to provide an improved push-pin and grommet assembly which includes a push-pin having a pair of diametrically opposed semicylindrical-shaped portions and a grommet having cylindrical-shaped mating grooves for retaining freely floating the semicylindrical-shaped portions in the mating grooves.

In accordance with these aims and objectives, the present invention is concerned with the provision of an improved push-pin and grommet assembly used for retaining a mating panel having a throughhole and a supporting panel having an oblong fitting hole and adapted to absorb variations in the relative positions of the supporting panel and the mating panel. The push-pin and grommet assembly includes a push-pin and a grommet. The push-pin includes a head portion and a shank portion extending from the head portion. The shank portion includes an upper section, small neck joined to the upper section, and an enlarged tip portion joined to the neck. The neck has a pair of diametrically opposed semicylindrical-shaped portions. The tip portion is defined by opposed narrow U-shaped flat surfaces and opposed triangular-shaped surfaces joined between the opposed U-shaped flat surfaces.

The grommet includes a relatively flat head flange and a main body portion. The head flange has a central opening therein and is formed of a front surface and a back surface. The main body portion is substantially of an ellipsoid for mating with the shape of the oblong mating hole in the supporting panel and extends from the back surface of the head flange to a closed free end. The main body portion is defined by a first pair of opposed outer wall surfaces on the pair of longer sides of the ellipsoid and by a second pair of opposed outer wall surfaces on the pair of shorter sides of the ellipsoid. The first pair of opposed outer wall surfaces have outwardly extending projections to provide shoulders for engaging upper and lower edges of the oblong fitting hole.

The main body portion includes cylindrically-shaped mating grooves formed on spaced opposed inner wall surfaces on the long sides of the ellipsoid and extend between the second pair of opposed outer wall surfaces for retaining freely floating the pair of semicylindrical-shaped portions when the push-pin is pushed axially so as to permit lateral sliding engagement between the second pair of opposed outer wall surfaces. The main body portion further includes a substantially U-shaped mating slot disposed co-axially with the mating grooves adjacent the closed end thereof for retaining slidably the enlarged tip portion.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
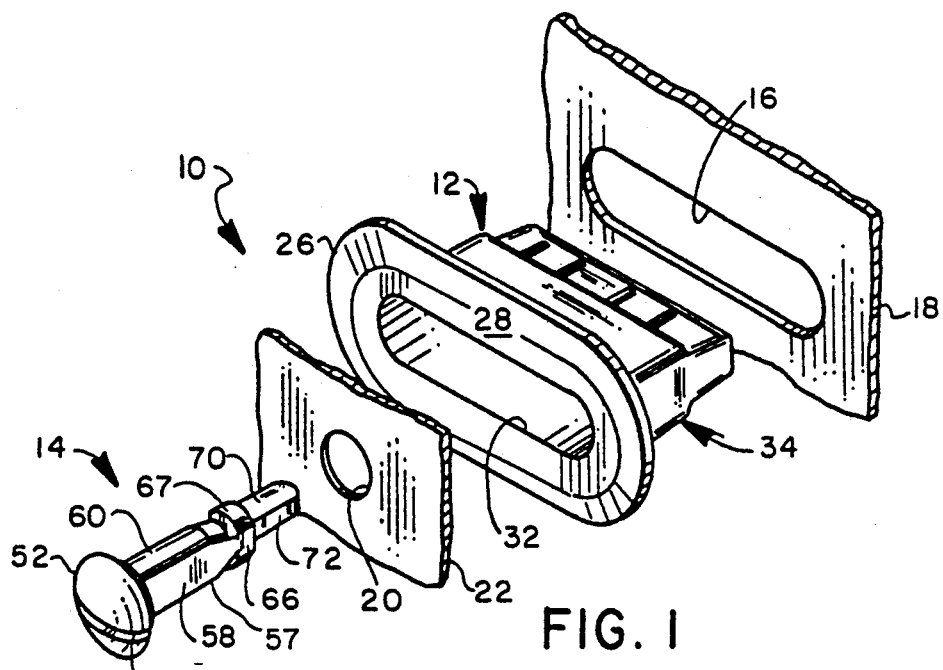
FIG. 1 is an exploded, perspective view of a push-pin and grommet assembly, constructed in accordance with the principles of the present invention.
Figure 2:
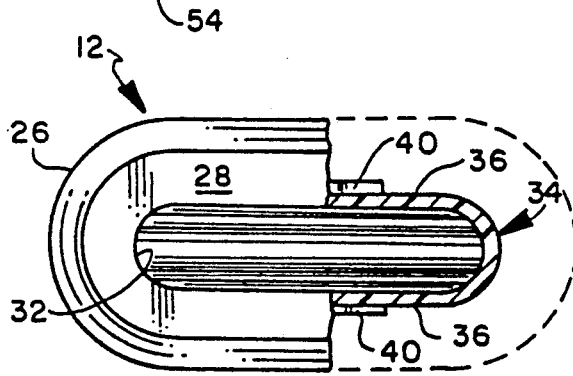
FIG. 2 is a front elevational view of the grommet in the assembly of FIG. 1.

Referring now in detail to the various views of the drawings, and in particular to FIGS. 1 through 7, there is shown a push-pin and grommet assembly designated generally by reference numeral 10 which is constructed in accordance with the principles of the present invention. The push-pin and grommet assembly 10 is formed of a grommet 12 and a push-pin 14. The grommet is inserted and retained in an oblong fitting hole 16 formed in a supporting panel 18, such as a metal door panel of an automobile. Thereafter, the push-pin 14 is inserted through a throughhole 20 formed in a mating panel 22, such as a decorative lining panel, and then snapped into mating grooves disposed on the interior of the grommet 12.

The grommet 12 is preferably formed of a unitary structure which is manufactured from a resilient plastic material or the like through a conventional plastic process such as injection molding. The grommet includes a head flange 26 which is of a generally flat elliptical shape. However, it should be apparent to those skilled in the art that the head flange 26 may have a round, square, or any other shape than the elliptical shape illustrated in the one illustrated embodiment shown in the drawings. The head flange 26 also has a generally flat front surface 28 and a generally flat back surface 30.

The head flange 26 further has a generally elliptical-shaped or oblong opening 32 formed through its center. The opening 32 is defined by the main body portion 34 which is formed of an ellipsoid or elliptical cylinder with a closed bottom having a shape conforming to the shape of the oblong fitting hole 16 of the supporting panel 18. On the opposed outer wall surfaces 36 on the long sides of the elliptical-shaped grommet 12, there are provided a pair of outwardly extending projections 38 defining shoulders 40, to engage the upper and lower edges of the fitting hole 16 of the supporting panel.

The grommet 12 also includes cylindrical-shaped mating channels or grooves 42 formed on the opposed spaced inner walls on the long sides thereof and extending between the opposed outer wall surfaces 44 on the short sides thereof. Further, the grommet includes a substantially U-shaped mating slot 46 formed on the opposed inner walls on the long sides thereof and extending between the opposed outer walls 44 on the short sides thereof. The mating slot 46 is disposed coaxially spaced relative to the grooves 42 and at the distal closed end 48 of the main body portion 34.

Figure 4:
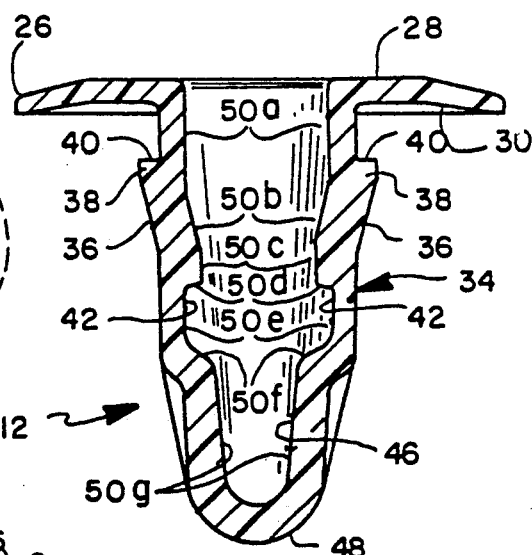
FIG. 4 is a cross-sectional view, taken along the 4—4 of FIG. 3.
Figure 3:
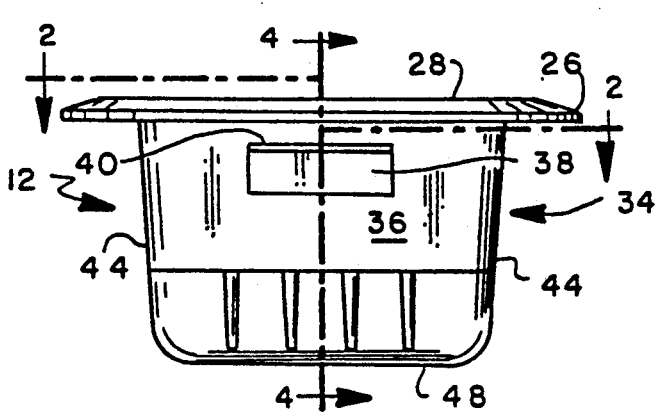
FIG. 3 is a top plan view of the grommet in FIG. 2.
Figure 5:
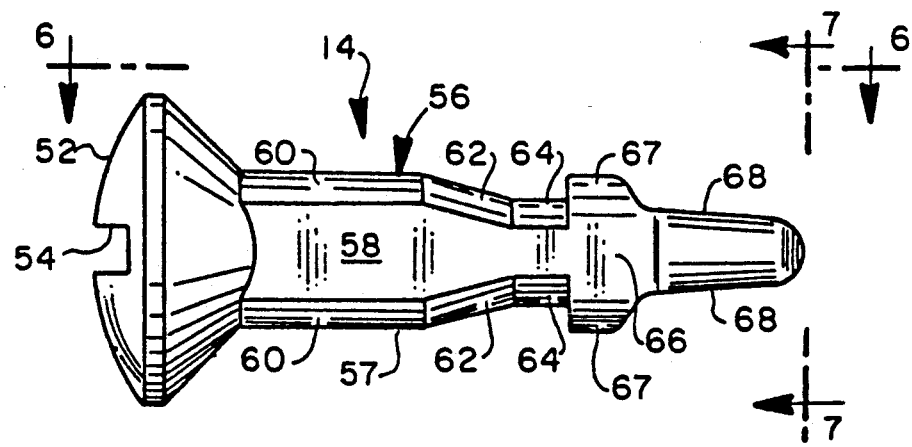
FIG. 5 is a side elevational view of the push-pin in the assembly of FIG. 1.
Figure 6:
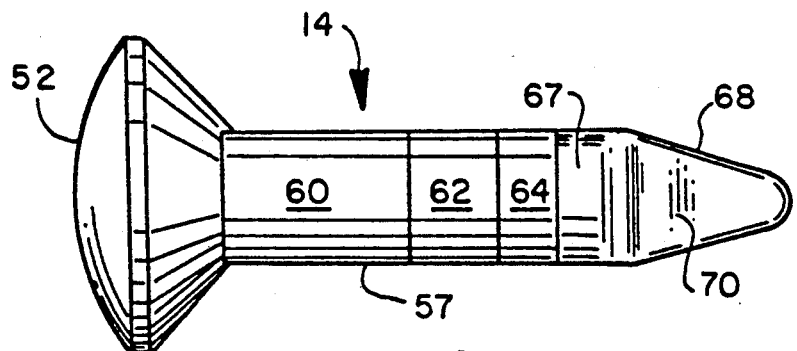
FIG. 6 is a plan view of the push-pin, taken along the lines 6—6 of FIG. 5.
Figure 7:
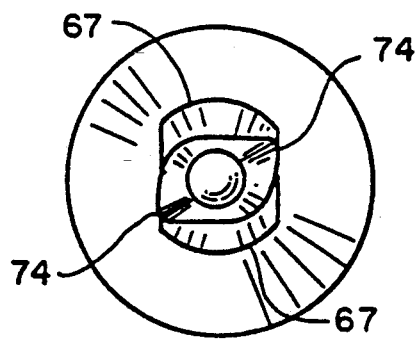
FIG. 7 is an end view of the push-pin, taken along the lines 7—7 of FIG. 5.

In particular, as can best be seen from FIG. 4, the interior walls on the long sides of the main body portion 34 extending in the direction from the oblong opening 32 toward the inside bottom surface thereof includes opposed faces 50a extending parallel to the axis of the opening, opposed inclined faces 50b oriented toward the inside bottom, opposed faces 50c extending parallel to the axis of the opening, outwardly-extending opposed inclined surfaces 50d, opposed faces 50e extending parallel to the opening, inwardly-extending opposed inclined faces 50f, and opposed inclined faces 50g oriented towards the inside bottom of the main body portion 34. The opposed faces 50d, 50e, and 50f form the cylindrical-shaped mating grooves 42. The opposed inclined faces 50g form in conjunction with the inside bottom of the main body portion 34 the U-shaped mating slot 46.

A push-pin 14 includes a head portion 52 having a cross-slot 54 and a shank portion 56 extending from the head portion. The shank portion 56 has an upper section 57 defined by opposed flat surfaces 58 and opposed arcuate surfaces 60 joined between the flat surfaces 58. Continuing from the outer end of the upper section 57, the shank portion 56 includes a pair of opposed inwardly tapered surfaces 62 and a pair of opposed short flat surfaces 64 joining the tapered surfaces 62 to a small neck 66. A pair of diametrically opposed semicylindrical-shaped portions 67 are formed on the small neck 66. At the outer end of the neck, the push-pin terminates in an enlarged tip portion 68. The tip portion 68 is defined by opposed narrow U-shaped flat surfaces 70 and opposed triangular-shaped surfaces 72 joined between the flat surfaces 70. Adjacent the lower end of the neck, there are provided two diametrically opposed sharp corners 74 (FIG. 7) which prevent the push-pin 14 from being rotated in one direction, as will be explained more fully hereinafter.

Figure 8:
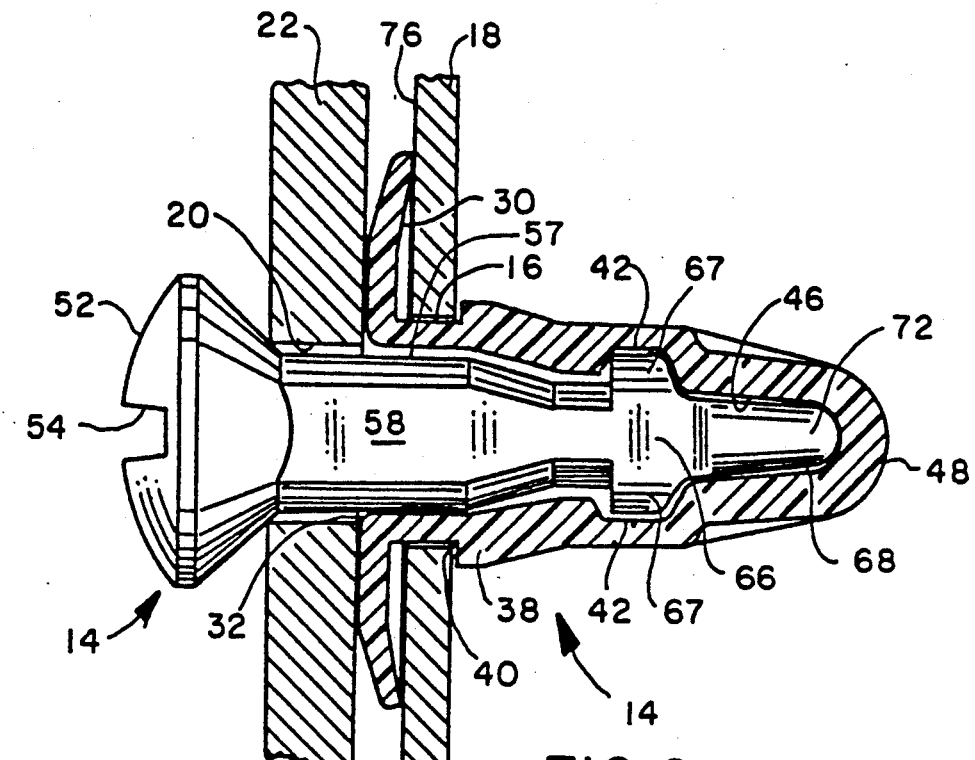
FIG. 8, is a cross-sectional view of the push-pin and grommet assembly in its fully assembled condition for securing a decorative lining panel to a supporting panel.

The preferred method of fastening the decorative lining panel 22 to the supporting panel 18 by the use of the push-pin and grommet assembly 10 of the present invention constructed as described will now be explained. Initially, the main body portion 34 of the grommet 12 is inserted into the oblong fitting hole 16 in the supporting panel 18 (FIG. 1) until the back surface 30 of the head flange 26 engages against the exposed surface 76 of the panel 18, as shown in FIG. 8. As axial pressure is applied to the grommet, the pair of outwardly extending projections 38 are caused to collapse or flex inwardly to allow the main body portion 34 to pass through the fitting hole 16 and then snap outwardly so that the shoulders 40 will engage the upper and lower edges of the fitting hole. The shoulders serve to hold securely the back surface 30 of the head flange 26 against the exposed surface of the supporting panel.

The decorative lining panel 22 to be secured is then positioned over the grommet 12 so that the throughhole 20 therein is aligned centrally with the oblong opening 32 in the head flange 26, and the push-pin 14 is inserted through the throughhole 20 in the decorative panel and into the oblong opening 32 in the head flange. Next, the push-pin 14 is pushed axially without turning so as to have the tip portion 68 and the neck 66 thereof led in by guiding portions, defined by the surfaces 50a-50c on the inner walls of the main body portion 34 of the grommet, until the semicylindrical-shaped portions 67 snap into fast engagement with the mating grooves 42 with the tip portion 68 being engaged in the mating slot 46. As a result, the decorative panel 22 is securely fixed to the supporting panel 18 since the push-pin 14 cannot be withdrawn axially from the grommet 12. However, the semicylindrical-shaped portions 67 of the push-pin 14 are retained freely floating in the mating grooves 42 and the tip portion is engaged freely in the mating slot 46 so as to permit lateral sliding engagement without loss of retention between the opposed outer wall surfaces on the short sides of the main body portion 34 of the grommet.

In order to remove the push-pin 14 from the grommet 12 so as to separate the decorative panel 22 from the mounted position on the supporting panel 18 for replacement, repair and the like, there is required the use of a suitable tool, such a screwdriver or coin, which is inserted in the cross-slot 54 of the head portion 52 of the push-pin. Then, the push-pin is rotated about its longitudinal axis by a quarter-turn (angular displacement of 90°) in the counter-clockwise direction.

Figure 9:
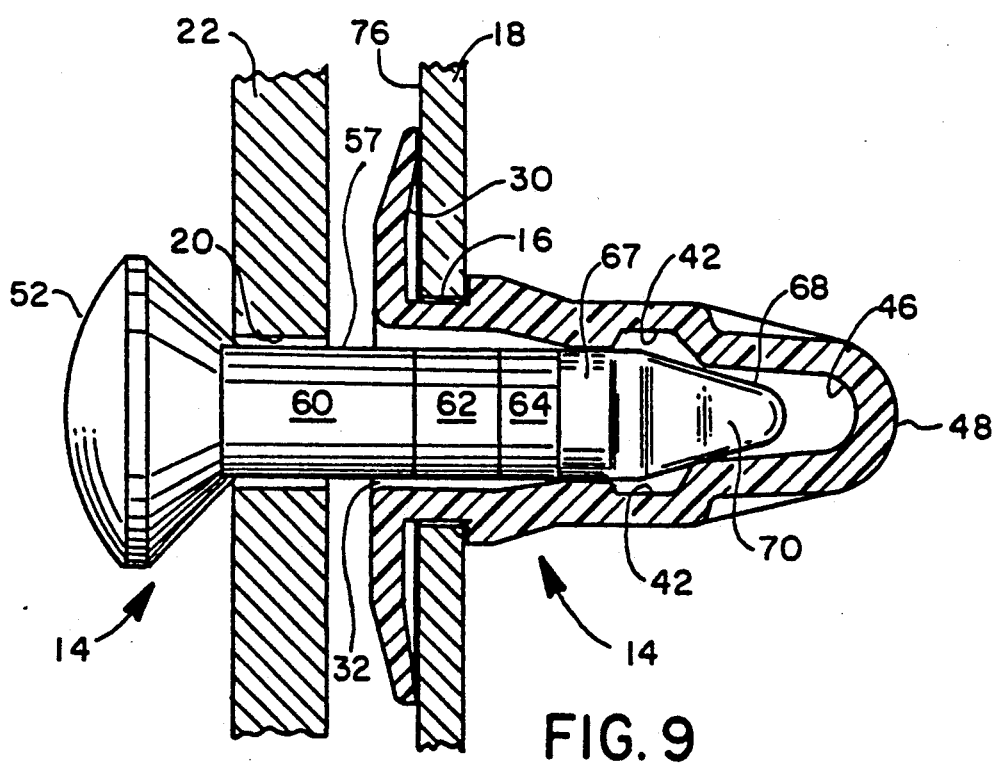
FIG. 9 is a cross-sectional view similar to FIG. 8, but with the push-pin being rotated 90° from the position shown in FIG. 8 and popped laterally to the left.

It will be noted that the sharp corners 74 (FIG. 7) provide a predetermined resistance to rotation in the clockwise direction, but permit rotation in the counter-clockwise direction. As a result of such rotational movement, the semicylindrical-shaped portion 67 of the push-pin will become disengaged from the mating grooves 42 of the grommet so as to cause the push-pin to pop-up with the tip portion 68 separating from the bottom of the U-shaped slot 46, as shown in FIG. 9. Thus, the push-pin 14 can be moved by fingers of the user from the grommet without damage.

If the decorative lining panel 22 expands or contracts due to changes in the ambient temperature after fixation of the push-pin into the grommet secured in the supporting panel so as to cause a variation in the relative positions of the decorative and supporting panels, this relative variation can be completely absorbed because the semicylindrical-shaped portions 67 allow the push-pin to easily slide laterally within the mating grooves 42 proportional to the misalignment of the decorative panel 22 and the supporting panel 18. The lateral movement of the push-pin 14 would be into and out of the plane of the drawing of FIG. 8.

From the foregoing detailed description, it can thus be seen that the present invention provides an improved push-pin and grommet assembly of a unique construction which is capable of absorbing relative lateral positions of a supporting panel and a mating panel to be attached caused by thermal expansion and contraction. A pair of diametrically opposed semicylindrical-shaped portions are disposed on the push-pin and cylindrically-shaped mating grooves are formed in the grommet for retaining freely floating the push-pin in the grommet so as to permit lateral sliding engagement between the opposed outer wall surfaces on the short sides of the main body portion of the grommet.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A push-pin and grommet assembly used for retaining a mating panel having a throughhole to a supporting panel having an oblong fitting hole and adapted to absorb variations in the relative positions of the supporting panel and the mating panel, said assembly comprising in combination:
   a push-pin including a head portion and a shank portion extending from the head portion;
   said shank portion including an upper section, a small neck joined to the upper section, and an enlarged tip portion joined to the neck;
   said neck having a pair of diametrically opposed semicylindrical-shaped portions, said tip portion being defined by opposed narrow U-shaped flat surfaces and opposed triangular-shaped surfaces joined between said opposed U-shaped flat surfaces;
   a grommet including a relatively flat head flange and a main body portion, said head flange having a central opening therein and being formed of a front surface and a back surface, said main body portion being substantially of an ellipsoid for mating with the shape of the oblong fitting hole in said supporting panel and extending from the back surface of said head flange to a closed free end;
   said main body portion being defined by a pair of opposed outer wall surfaces on the pair of longer sides of said ellipsoid and by a second pair of opposed outer wall surfaces on the pair of shorter sides of said ellipsoid, said first pair of opposed outer wall surfaces having outwardly extending projections to provide shoulders for engaging upper and lower edges of the oblong fitting hole;
   said main body portion having cylindrical-shaped mating grooves formed on spaced opposed inner wall surfaces and extending between said second pair of opposed outer wall surfaces for retaining freely floating said pair of semicylindrical-shaped portions when said push-pin is pushed axially so as to permit lateral sliding engagement of said pair of semi-cylindrical-shaped portions between said second pair of opposed outer wall surfaces; and
   said main body portion further including a substantially U-shaped mating slot disposed co-axially with said mating grooves adjacent the closed end thereof for retaining slidably said enlarged tip portion.

2. A push-pin and grommet assembly as claimed in claim 1, further comprising slot means formed on said head portion of said push-pin for accommodating a tool for rotatably turning said push-pin about its longitudinal axis.

3. A push-pin and grommet assembly as claimed in claim 2, wherein said push-pin is rotated a quarter-turn in one direction for disengaging said semicylindrical-shaped portions from said mating grooves so as to cause said push-pin to pop-up with said tip portion separating from the bottom of said U-shaped slot, thereby allowinq said push-pin to be removed.

4. A push-pin and grommet assembly as claimed in claim 1, wherein said central opening in said head flange has an oblong cross-section.

5. A push-pin and grommet assembly as claimed in claim 1, wherein said head flange has a substantially elliptical shape.

6. A push-pin and grommet assembly as claimed in claim I, further comprising corner means formed on said push-pin for limiting the rotation thereof in one direction to permit removal of the same from said grommet.

7. A push-pin and grommet assembly used for retaining a mating panel having a throughhole through a supporting panel having an oblong fitting hole and adapted to absorb variations in the relative positions of the supporting panel and the mating panel, said assembly comprising in combination:
   a push-pin including a head portion and a shank portion extending from the head portion;
   said shank portion including a pair of diametrically opposed semicylindrical-shaped portions and terminating in enlarged tip portion;
   a grommet including a relatively flat head flange and a main body portion, said head flange having a central opening therein and being formed of a front surface and a back surface, said main body portion being substantially of an ellipsoid for mating with the shape of the oblong fitting hole in said supporting panel and extending from the back surface of said head flange to a closed free end;
   said main body portion being defined by a pair of opposed outer wall surfaces on the pair of longer sides of said ellipsoid and by a second pair of opposed outer wall surfaces on the pair of shorter sides of said ellipsoid, said first pair of opposed outer wall surfaces having outwardly extending projections to provide shoulders for engaging upper and lower edges of the oblong fitting hole;
   said main body portion having cylindrical-shaped mating grooves formed on spaced opposed inner wall surfaces and extending between said second pair of opposed outer wall surfaces for retaining freely floating said pair of semicylindrical-shaped portions when said push-pin is pushed axially so as to permit lateral sliding engagement of said pair of semi-cylindrical-shaped portions between said second pair of opposed outer wall surfaces; and
   said main body portion further including a substantially U-shaped mating slot disposed co-axially with said mating grooves adjacent the closed end thereof for retaining slidably said enlarged tip portion.

8. A push-pin and grommet assembly as claimed in claim 7, further comprising slot means formed on said head portion of said push-pin for accommodating a tool for rotatably turning said push-pin about its longitudinal axis.

9. A push-pin and grommet assembly as claimed in claim 8, wherein said push-pin is rotated a quarter-turn in one direction for disengaging said semicylindrical-shaped portions from said mating grooves so as to cause said push-pin to pop-up with said tip portion separating from the bottom of said U-shaped slot, thereby allowing said push-pin to be removed.

10. A push-pin and grommet assembly as claimed in claim 7, wherein said central opening in said head flange has an oblong cross-section.

11. A push-pin and grommet assembly as claimed in claim 7, wherein said head flange has a substantially elliptical shape.

12. A push-pin and grommet assembly as claimed in claim 7, further comprising corner means formed on said push-pin for limiting the rotation thereof in one direction to permit removal of the same from said grommet.

* * * * *